June 8, 1926. 1,588,323
F. A. MACNAB
WAGON CONSTRUCTION
Filed Dec. 24, 1925
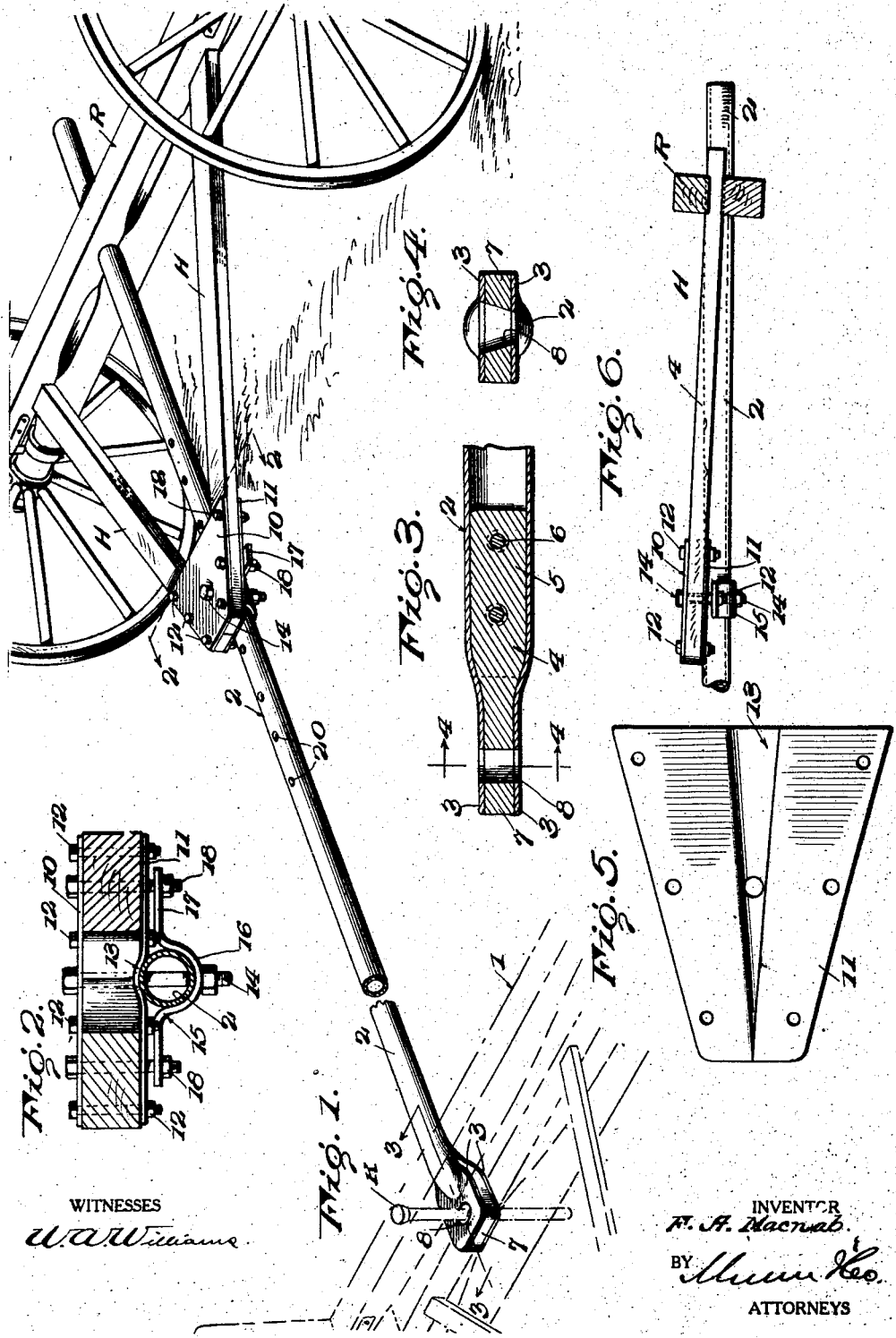
WITNESSES
INVENTOR
F. A. Macnab.
BY
ATTORNEYS Patented June 8, 1926.

1,588,323

UNITED STATES PATENT OFFICE.

FRANCIS A. MACNAB, OF SALMON, IDAHO.

WAGON CONSTRUCTION.

Application filed December 24, 1925. Serial No. 77,532.

This invention relates in general to wagon construction, and more particularly to an improved reach having novel means for connecting it with the king bolt and novel means for securely and rigidly fastening the hounds thereto in the desired and proper adjustment.

The object of the invention is to provide a wagon reach which is extremely strong and durable and properly organized with the other elements of the running gear in such manner as to permit relatively movable parts to partake of their proper movements and as to hold rigidly fastened parts firmly and securely in position and against relative movement in any direction.

Accordingly the present invention consists in the provision of a wagon reach consisting of a metal tube, which may conveniently be a steel tube, and of the provision at the forward end of said tube of a king bolt connecting member. The king bolt connecting member is organized with the metal tube in a novel and effective manner, and it has a special form of opening designed to receive the king bolt to permit the necessary rocking movement and yet prevent lost motion or undesirable freedom between the parts. Novel means is provided for connecting the tube to the hounds of the wagon, and not only provides for an adjustable connection between the hounds and tube, but also prevents in a positive and certain manner any relative movement between the hounds and the tube.

Other objects and advantages reside in certain novel features of the construction arrangement and combination of parts which will be hereinafter more fully described and particularly pointed out in the appended claims, reference being had to the accompanying drawings forming a part of this specification and in which:

Figure 1 is a fragmentary perspective view showing the running gear of a wagon constructed in accordance with the present invention, Figure 2 is a view in transverse section on line 2—2 of Fig. 1, Figure 3 is a view in longitudinal section on line 3—3 of Fig. 1, Figure 4 is a view in transverse section on line 4—4 of Fig. 3, Figure 5 is a detail view in bottom plan showing the under attaching plate, and Figure 6 is a fragmentary view in side elevation showing how the hounds are connected to the wagon reach.

Referring to the drawings, the numeral 1 designates generally the running gear of a wagon. A wagon reach designated at 2 is provided and consists of a steel tube.

At its forward end the tube 2 is transversely split and the portions defined by the split are flattened out to provide wings 3. A reinforcing and filler member 4 is provided and has a portion 5 fitted in the tubular end portion of the steel tube 2 and fastened thereto by rivet 6. The member 4 also has a flattened portion 7 against the sides of which the wings fit. The wings 3 and the portion 7 are provided with an oblong opening 8, the walls of which diverge upwardly as shown in Fig. 4. This opening 8 accommodates the king bolt K and by virtue of its diverging form permits the desirable rocking movement but prevents relative longitudinal movement. The specially constructed forward end of the tube 2 and the member 4 together constitute king bolt connecting means.

The running gear of the wagon also includes the usual hounds H which extend between the reach rod 2 and the rear axle assembly R. Means is provided for rigidly securing the forward ends of the hounds H to the wagon reach 2, and comprises a pair of hound engaging plates designated at 10 and 11. The hounds H are disposed between the plates 10 and 11 and are fastened thereto by bolts and nuts 12. The under plate 11 is provided with a recess 13 which is transversely curved and longitudinally tapered, as may be seen from a comparison of Figs. 2 and 5. This formation of the recess 13 permits the plates to incline themselves in accordance with the inclination of the hounds, and yet permits the recess to receive a portion of the reach 2. A bolt and nut 14 coacts with the plates 10 and 11 and the reach 2 to secure the plates and consequently the hounds H to the reach 2. This effects securing of the plates and hounds against all except rocking or pivotal movement in a horizontal plane, and such movement is prevented by virtue of the engagement of the recess 13 with the reach and also by virtue of the provision of clamping means for clamping the reach in the recess 13. Preferably the clamping means for the clamping bar 15 having a curved portion 16 engaging the reach 2 and having end portions 17 spaced from the plate 11 and clamped to the plates 10 and 11 are bolts and nuts 18. The bolt 14 may be extended to any one of a longitudinal series of spaced and transversely extending openings 20 provided in the wagon reach 2, so that the hounds may be connected to the wagon reach in any longitudinal adjustment.

What is claimed is:

1. A wagon reach comprising a tubular member, king bolt connecting means carried by said member, and means cooperable with the tubular member and adapted to fasten a pair of hounds thereto and comprising a pair of hound engaging plates, means adapted to secure the plates to the hounds, means for securing the plates to the tubular member against all except rocking movement, one of said plates having a recess in which a portion of the tubular member is fitted and means for clamping such portion in said recess to prevent rocking movement of the plates relative to the tubular member.

2. A wagon reach comprising a tubular member, king bolt connecting means carried by said member, and means cooperable with the tubular member and adapted to fasten a pair of hounds thereto, means adapted to secure the plates to the hounds, said plates being slightly inclined in assembly, the under plate having a transversely curved and longitudinally tapered recess engaging a portion of the tubular member, a bolt and nuts for fastening the plates to the tubular member, said tubular member having a plurality of spaced and transversely extending openings with which said bolt is selectively cooperable to fasten the plates to the tubular member in a desired longitudinal adjustment, and clamping means coacting with the plates for securing a portion of the tubular member engaged with the recess of one of the plates.

3. A wagon reach comprising a tubular member, said tubular member having a longitudinal series of spaced transversely extending openings, means adapted to fasten a pair of hounds together and comprising a pair of hound-engaging plates, fastening means for securing the plates to the hounds, means for clamping one of the plates against the tubular member, and means for fastening the plates to the tubular member and including a bolt selectively engageable with any one of the series of openings of the tubular member.

4. A wagon reach comprising a metal tube having its forward end portion transversely split and having the opposed portions defined by such said split flattened out though spaced apart, and a king bolt connecting member having a portion fitted in and secured to the portion of the tube immediately rearward of the split thereof and having a flattened portion engaged by the flattened portions of the tube.

FRANCIS A. MACNAB.